United States Patent [19]

Gramkow et al.

[11] Patent Number: 5,906,714

[45] Date of Patent: May 25, 1999

[54] METHOD FOR TREATING EMULSIFIED LIQUIDS

[75] Inventors: Asger Gramkow, Augustenborg; Jeppe Christian Bastholm; Finn Erik Christensen, both of Soenderborg, all of Denmark

[73] Assignees: Agro Miljø A/S, Soenderborg, Denmark; OHM Electric Co., Ltd., Shizuoka, Japan

[21] Appl. No.: 08/731,459

[22] Filed: Oct. 15, 1996

Related U.S. Application Data

[63] Continuation of application No. 08/193,090, filed as application No. PCT/DK91/00212, Jul. 18, 1991, abandoned.

[30] Foreign Application Priority Data

Aug. 23, 1990 [DK] Denmark .................................. 2018/90
Feb. 22, 1991 [DK] Denmark .................................. 2018/91

[51] Int. Cl.⁶ .............................. B01D 1/28; B01D 3/42; C02F 1/04
[52] U.S. Cl. .............................. 203/2; 159/24.1; 159/44; 159/47.1; 159/901; 202/160; 202/182; 203/14; 203/24; 203/98; 203/DIG. 9; 203/DIG. 18; 210/265; 210/741; 210/742; 210/774
[58] Field of Search ..................................... 208/184, 179; 202/160, 206, 176, 182, 235; 210/265, 774, 739–742, 664–665; 203/10, 14, 23, 2, 24, 4, 26, 25, 100, 27, 98, DIG. 8, DIG. 25, DIG. 18, DIG. 9; 159/24.1, 901, 44, 46, 47.1; 73/708, 716

[56] References Cited

U.S. PATENT DOCUMENTS

| | | | |
|---|---|---|---|
| 2,487,884 | 11/1949 | Lunt | 203/10 |
| 3,613,699 | 10/1971 | Holm | 202/170 |
| 3,791,161 | 2/1974 | Kramer | 62/226 |
| 3,891,510 | 6/1975 | Drostholm et al. | 202/160 |
| 4,136,528 | 1/1979 | Vogel et al. | 62/174 |
| 4,455,477 | 6/1984 | Massey et al. | 219/328 |
| 4,655,087 | 4/1987 | Rozniecki | 73/708 |
| 4,698,136 | 10/1987 | El-Allawy | 203/11 |
| 4,985,118 | 1/1991 | Kurematsu et al. | 202/181 |
| 5,285,652 | 2/1994 | Day | 62/199 |
| 5,430,227 | 7/1995 | Erbse et al. | 210/739 |

OTHER PUBLICATIONS

Coulson & Richardson Chemical Engineering vol. 2, 3rd ed. 1978 pp. 655–656.

*Primary Examiner*—Virginia Manoharan
*Attorney, Agent, or Firm*—Watson Cole Grindle Watson, P.L.L.C.

[57] ABSTRACT

A method of separating water from an aqueous emulsion using a minimum of energy includes heating the aqueous emulsion in a sump, conveying concentrated emulsion from the sump to a heat exchanger so as to pass therethrough back to the sump, circulating water vapor and non-condensable gases from the sump through a compressor to raise its temperature and passing the heated water vapor and non-condensable gases through the heat exchanger to condense and heat the concentrated emulsion therein and evaporate water therefrom, a thermostat filled with water and water vapor, together with first and second pressure switches respectively communicating with the sump and the external atmosphere and the heat exchanger and the external atmosphere, maintaining a temperature differential between 0.5° and 3° C. between the aqueous emulsion in the sump and the temperature of the compressed water vapor and noncondensable gases. A similar method can separate solvent from a solvent emulsion with a temperature differential of 1° to 6° C.

6 Claims, 5 Drawing Sheets

METHOD FOR TREATING EMULSIFIED LIQUIDS

CROSS REFERENCE TO RELATED APPLICATION

This application is a continuation of application Ser. No. 08/193,090, filed Mar. 23, 1993, now abandoned, which is a 371 of PCT/DK91/00212, filed Jul. 18, 1991.

BACKGROUND OF THE INVENTION

The present invention relates to an apparatus and a method for treating and separating emulsified liquids. Thus, the invention relates to cleaning and separating of emulsified liquids, especially cooling/lubricating oil emulsions, degreasing water, oil-containing waste water, waste water from laundries, from food production, solvents and the like. The method involves vapor compression wherein emulsified liquids in a sump are heated to a temperature level just below the boiling point of the liquid to be distilled, and in which the vapors which are produced at a first side of a heat exchanger and in the sump are compressed in a compressor, whereby the temperature is increased, and which compressor leads the so-heated vapors into the second side of the heat exchanger in which they are cooled and condensed, and in which the heat released by the condensation is transferred to the emulsified liquid at the first side of the heat exchanger so that the liquid to be distilled is evaporated, and wherein the level for this temperature range is determined on the basis of the desired distillate. The separation of the specific substances and water or solvents is often required due to recycling of the water and/or for reducing the costs of transportation and destruction of waste water.

Industry uses various solvents, e.g., for degreasing and cleaning. In addition, the engineering industry uses cooling/lubrication oils mixed with water. These often enter into a heavy emulsification with the water, which means that the emulsified liquid is very difficult to separate. When the agent for degreasing, cleaning, cooling and lubricating has been used a number of times, it becomes saturated with dirt, heavy metals, moisture, and other impurities. Therefore, a concentration or a destruction of the agent in question is required.

Usually the concentration of solvents is performed by means of a simple boiling, followed by a subsequent cooling, typically by using water as cooling agent. This method is disadvantageous as it is energy consuming.

In recent years the concentration of cooling/lubricating oil emulsifications has been impeded because softeners are added to the cooling/lubricating agents, thus the oils emulsify heavily with water. Consequently, a subsequent concentration is very difficult.

Besides boiling, a chemical method for separating emulsified liquids is known. However, chemical separation is an expensive method requiring an exact adaption of a demulsifying agent, and usually it will only be economical at concentrations of polluting liquids in the main liquid lower than 1%.

Yet another method for concentration of solvents is known, viz. the so-called ultra filtration, in which the specific elements are separated by filtration. This process is also expensive, and moreover problems as to clogging of the specific filters arise, and consequently the method is subjected to uncertainty and requires a demand for frequent supervision.

U.S. Pat. No. 4,698,136 discloses a method corresponding to the above-described method wherein for continuous cleaning of water containing salt, hydrocarbons and $Fe^{++}$, mechanical vapor compression is used. According to this patent, the liquid to be cleaned is initially subjected to a mechanical cleaning in the form of gravitation separation. This gravitational separation however, cannot separate stabilized emulsions. And if the liquid emerging from the mechanical cleaning step is a stabilized emulsion, the process described cannot provide an efficient cleaning and separation.

As mentioned above, the principle used is referred to as mechanical vapor compression, and it is disclosed in Danish Patent Nos. 68,529 and 78,060 filed by Mr. Rolf Andersen. It has been used for treating radioactive waste water, for producing drinking water out of sea water, as well as for concentrating brine, exclusively for use in very large complicated systems.

It is the object of the present invention to remedy the disadvantages associated with the known processes and to provide a method in which the separation is established by means of a boiling process and a subsequent cooling and in some cases by means of gravitational separation, and by subsequent cooling using a minimum of energy.

SUMMARY OF THE INVENTION

According to the present invention this object is achieved by a method of the type described above but which is characterized in that the temperature difference between the evaporation and the condensation is kept within a narrow temperature range of about 0.5–12° C., that the temperature level of the emulsified liquids is controlled by a thermostat in combination with a pressure switch, which thermostat is filled with a mixture of vapor and liquid identical with the desired distillate. The temperature difference is maintained at about 0.5–3° C. for treating aqueous liquids and about 1–12° C. and preferably 1–6° C. for treating solvent emulsions. The corresponding pressure ranges are about 20–120 mbar for treating aqueous liquids and 50–200 mbar for treating solvent emulsions.

Depending on the boiling point of the specific elements in the polluted liquid, the pressure and the temperature are regulated in the evaporation chamber. The polluted liquid is heated by means of the heating element, e.g., to 100° C., and this temperature is maintained by pre-heating the liquid in a heat exchanger and by adding extra heat—if necessary—by means of the heating element. A very precise controlling of the temperature level is obtained. Since the temperature depends on the pressure, a controlling of the level is quicker by use of the pressure switch, which reacts promptly to changes in the pressure, and thus changes in the temperature.

Heating in the sump may be provided by means of an electric heating element, and the heat exchanger used may preferably be a tube or plate heat exchanger of which the first side and the second side are connected to the compressor, ensuring the transfer of the vapor and the pressure increase. The emulsified liquid is transferred from an external source to the sump. This may, e.g., take place via a heat exchanger. From the sump the emulsified liquid is pumped up into the top of the tube heat exchanger, from which it can flow down through the tube heat exchanger as a liquid film, achieving an evaporation. In some cases, during the transfer from the sump to the top of the tube heat exchanger, a partial flow can be led into a gravitation separator containing a float able to float on one of the liquids but not on the other, e.g., on water but not on oil. This float controls a solenoid valve leading the partial flow back to the system after having drawn off the separated liquid, e.g., oil from the top of the gravitation separator. This separation process may be very fast due to the high temperature of the liquid and the corresponding low viscosity of oil. When the emulsified liquid is concentrated due to the evaporation, it becomes unstable which makes it possible to effect the gravitational separation. Also, the fact that the liquid is provided at a raised temperature level is important. E.g., lubricating oils are provided in which the components have identical density at a working temperature at a level of approximately 20–30° C. By raising the temperature a difference is obtained in the density of the components. This difference and the fact that the emulsion has become unstable is very important in order to have the efficient gravitational separation.

A supervision of the level of the condensed liquid may preferably be made in the evaporation chamber. Also, the measurement of the pressure and the temperature of the condensed liquid is made in the evaporation chamber with a view to control the progress of the procedure.

The condensed liquid can be led through a coalescer before it is drained out. This ensures that any oils transferred with the vapor are separated. Furthermore, the apparatus may comprise a density metering device that releases a small amount of the concentrated waste water if the ion concentration and the corresponding density become too high, causing increased boiling temperature.

The method will preferably be effected in a unit provided in an insulated chamber.

The circulation pump transfers the heated liquid up into the uppermost part of the evaporation chamber so that it flows down into the tube heat exchanger on the inner side of the tubes as a liquid film. By means of the compressor the pressure is increased, and hereby the vapor is supplied with energy in the form of pressure and heat. The latter causes an energy flow in the tube heat exchanger and provides an evaporation on the inner side of the tubes. Now the energy circle is complete.

Keeping the evaporation temperature difference and the condensation temperature within a very narrow range, e.g., 100–102° C., substances with a lower boiling point will not condense but will be vented in the vapor phase and condensed later in a condensation container from which it may be drawn off as a liquid for destruction or recycling.

Substances with a higher boiling point and solid particles will not evaporate. They remain in the liquid in the sump. When reaching a predetermined level of concentration, a draw-off is effected. Alternatively, such substances may be separated by gravitation separation and become almost completely concentrated. Concentration of the waste water takes place continuously in the sump.

It is important to keep the narrow temperature range in order to minimize energy consumption. The ion concentration in the waste water may effect the condensing temperature. Thus the density may be monitored by means of a density-metering device. Through a solenoid valve in the sump, it is possible to release a small amount of the concentrated waste water, thereby regulating the ion concentration and thereby keeping the evaporation and condensing temperature within a required range.

A method according to the present invention provides a safe separation of liquids in a distillate and undesired liquids and solid substances. It is also a very energy-saving method, as the efficiencies will be extremely high, up to 20–80 depending on the capacity. With the power factors mentioned, the price for treating 1 ton of polluted waste water typically ranges from DKK 2.50 to DKK 10.00.

The method according to the present invention may be effected with an apparatus of a very simple design and suited for use in the industry where the demands for simple and easy-to-service constructions are large as well as the investment costs area kept to a minimum level.

Besides, the method may be used for separating substances with different boiling points within a very narrow temperature range, as the present technology ensures that the evaporation and the subsequent condensation is effected within a very narrow temperature range, typically ranging from 1–2° C. Thus, substances with higher boiling points in the evaporation phase will not evaporate and at the subsequent condensation, substances with lower boiling points will not condense and may be blown off separately, and in this way they are separated.

When combining the vapor compression principle with the gravitation separation principle, it is possible to obtain an optimal separation and a fast process at the relatively high temperature and the corresponding low viscosity of oil.

The invention also relates to an apparatus for use in the above-mentioned method. The apparatus operates according to the vapor compression principle, optionally combined with a gravitation separation, and of the type which comprises means for boiling the emulsified liquid, means for cooling and condensing the vapors produced, which boiling and condensing means are constituted by a heat exchanger placed in an evaporation tank including a top and a sump connected to a pipe including a circulation pump and in which heat exchanger the evaporation and condensation take place. The condensed liquid is collected in the bottom of the evaporation tank, while the vapor is driven from the evaporation side, the first side, of the heat exchanger to the condensation side, the second side, by means of a compressor delivering a certain amount of energy to the vapor. The compressor and a heating element are controlled according to signals from pressure switches measuring the pressure in the evaporation tank and in the sump and according to signals from a thermostat connected to the sump and filled with a mixture of vapor and liquid identical with the desired distillate, a gravitation separator is connected to a branching of the pipe connecting the sump and the top of the evaporation tank just after the circulation pump, and the sump and the evaporation tank are supplied with draining-off means.

The apparatus may be equipped with a gravitation separator connected to a branching of the pipe connecting the sump and the top of the evaporation chamber and provided for concentration of a partial flow. The apparatus may also comprise a coalescer connected to the distillate outlet from the evaporation chamber.

Furthermore, a density regulator can be included to control the ion concentration in order to keep the boiling range within certain limits.

This apparatus, which preferably comprises a vertical tube heat exchanger and which preferably is placed in an insulated chamber, may be produced as a compact unit in which the method can be practiced in order to obtain the desired energy saving.

In a special compact version the apparatus can be designed with the evaporator chamber and compressor as an integrated unit. This is especially useful in apparatus with smaller capacities.

BRIEF DESCRIPTION OF THE DRAWINGS

The invention will now be further explained with reference to the accompanying drawings, wherein.

DETAILED DESCRIPTION OF THE PREFERRED EMBODIMENTS

The three embodiments illustrated have much in common and accordingly, identical or corresponding elements are designated with identical reference numbers in the different figures.

Figure 1:
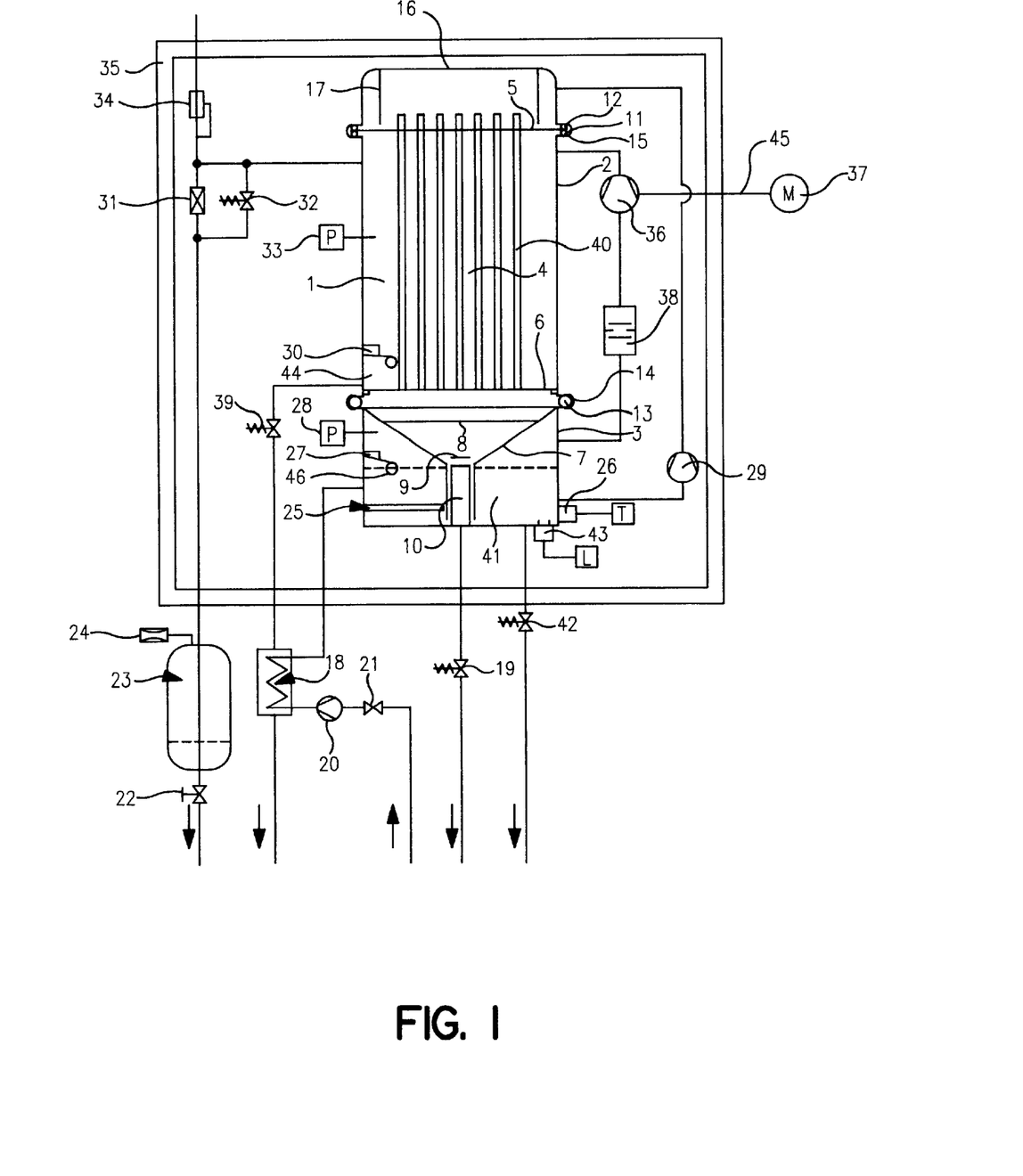
FIG. 1 is a schematic view of the apparatus according to the invention.

The apparatus illustrated in FIG. 1 comprises an evaporation tank 1, consisting of an outer shell 2, a cover 16, and a sump 3. These three parts are connected by flexible bands 14 and 15. In the shell 2 a tube heat exchanger 4 is placed consisting of vertically placed tubes 40 with a diameter of 6–25 mm welded onto an upper cover plate 5 and a lower cover plate 6. The tubes 40 extend about 50 mm through the upper cover plate 5, ensuring a correct and even distribution of a polluted liquid 41 to be treated (explained below).

The cover 16 is provided with a distribution ring 17. This distribution ring ensures that the polluted liquid 41 pumped from the sump 3 by means of the circulation pump 29 is evenly distributed to all the tubes 40.

The liquid 41 is fed from the sump 3 by means of a circulation pump 20 via a heat exchanger 18. In front of the circulation pump 20 a stop valve 21 is placed preventing reflux during standstill-periods.

The polluted liquid 41 is elevated to, e.g., 100° C.—in case of liquids with water as main element—by means of an electrical heating element 25. The temperature of the liquid 41 is controlled and supervised by means of a thermostat 26. The pressure in the evaporation tank 1 is controlled and supervised by a pressure switch 33.

The thermostat 26 and the pressure switches 28 and 33 are specially designed with a large diaphragm in order to meter very small differences. This is necessary in order to ensure a correct control of the boiling point and the corresponding vapor pressure for a distillate 44 in question. The interior of the thermostat 26 is filled with a reference liquid identical with the distillate 44. For example, with water to be distilled, the reference liquid is also water. The pressure switches 28 and 33 are designed so that an automatic adjustment takes place in case the atmospheric pressure changes. This is necessary in order to ensure a registration and adjustment of the correct vapor pressure during evaporation. In the sump 3 a conductivity meter 43 is placed supervising the content of ions in the liquid 41. In case the concentration is too high, a solenoid valve 42 is opened for draining off the concentrated liquid 41 from the bottom of the sump 3.

If the liquid 41 contains large amounts of oil and oily liquids lighter than the distillate 44, these will float on the surface of the liquid 41. Draining off this oil is controlled at the level controller 27 and the solenoid valve 19.

Figure 3:
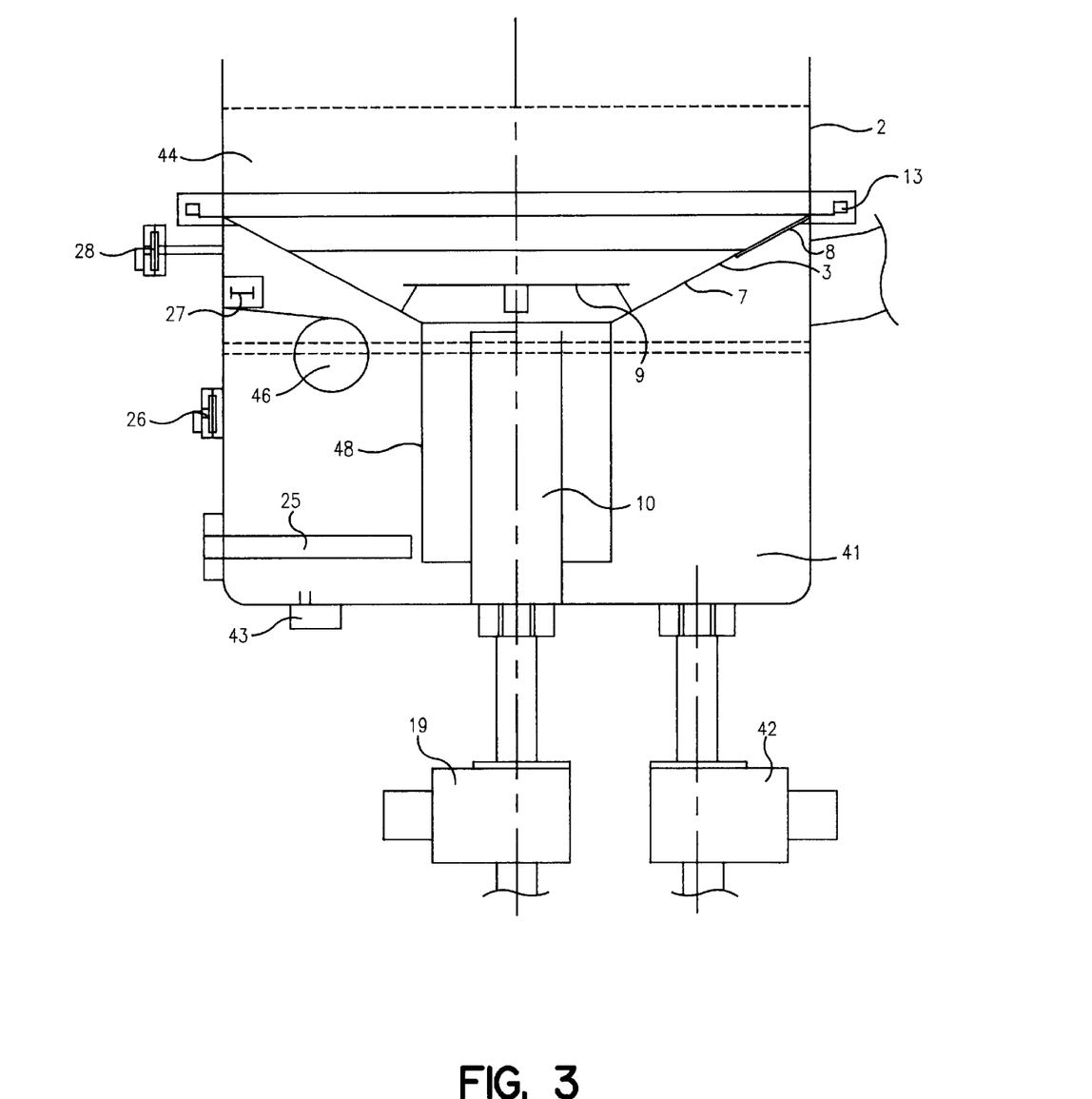
FIG. 3 illustrates the lowermost part of the evaporation tank illustrated in FIGS. 1 and 2.

The mode of operation and the special construction of the sump 3 in this connection are illustrated in FIG. 3 and will be described later.

In the evaporation tank 1 a level controller 30 is placed to supervise and to secure the draining off of the distillate 44 via a solenoid valve 39 and the heat exchanger 18. The heat exchanger 18 ensures that the heat removed by draining off the distillate 44 is transferred to the liquid 41 which is led into the sump 3, so that the heating element 25 must supply a minimum of power only.

When deactivating the apparatus and switching off the power, the solenoid valve 39 ensures that atmospheric air is drawn into the evaporation tank 1 and thus a pressure compensation is established. In operation the temperature in the evaporation tank 1 may be above 100° C., and during the cooling in connection with a deactivating of the apparatus, a vacuum could arise in the evaporation tank 1, so that it might collapse and be damaged.

The evaporation tank 1 is provided with the pressure switch 33 supervising the pressure and ensuring the blowing-off of the non-condensable gases via a solenoid valve 32 to a condensation chamber 23, in which the gas condensates due to a low temperature. The condensation chamber 23 is provided with a throttle valve 24 which on one hand empties non-condensable gases from the condensation chamber 23 and, on the other hand, ensures a continuous emptying of non-condensable gases from the evaporation tank 1 via a throttle valve 31. An emptying of the condensation chamber 23 is effected by means of a manual stop valve 22.

A mechanical safety valve 34 is mounted in the evaporation chamber 1 for extra security. A vapor compressor 36 driven by an electric motor 37 via a shaft 45 is connected to the sump 3. In order to prevent oil drops from being carried along from the sump 3 through the vapor compressor 36, a drop catch 38 is arranged in from the inlet of the vapor compressor 36.

The outlet of the vapor compressor 36 is connected to the upper part of the shell 2 connected to the outer part of the tube heat exchanger 4. The evaporation tank 1 with the vapor compressor 36, control means, and solenoid valves are encapsulated in an insulated cabinet 35 in order to maintain the correct working temperature.

Figure 2:
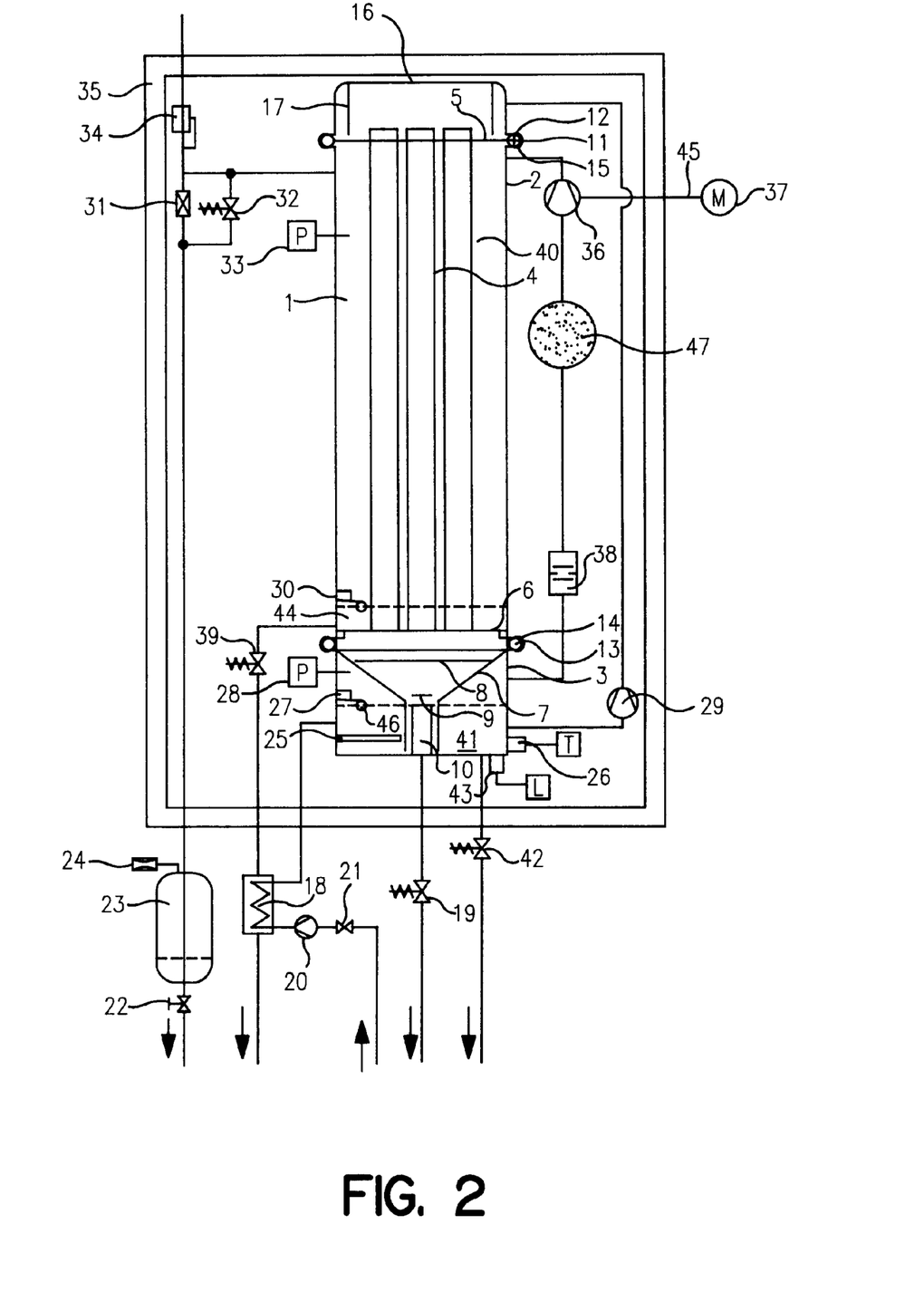
FIG. 2 is a schematic view of the apparatus according to the invention with a humidity-drying filter.

In principle the apparatus illustrated in FIG. 2 is identical with the apparatus shown in FIG. 1, however, with the exception that a humidity-drying filter 47 is placed between the vapor compressor 36 and the drop catch 38 in order to absorb humidity when the apparatus is used for treating, e.g., solvents or refrigerants where the demands to the level of residual moisture are extremely high.

In this version a standard tube size as shell 2 is used and a larger dimension for the tubes 40 as compared to tubes 40 of FIG. 1 are used, whereby a reduction in the manufacturing costs is obtained, and simultaneously the demands for an increased working pressure may be met.

This version is also suitable for small capacities of 5–10 l/h for liquids with water as the main element.

FIG. 3 illustrates the sump 3 being so embodied that separation of oil from the liquid is optimized.

When the level controller 27 with a float 46 indicates low level of liquid, liquid 41 is added until an upper level is reached. Simultaneously, with the initial filling the solenoid valve 19 is opened, so that the oil accumulated in the wide tube 48 flows over the edge of an inner tube 10 and out of the sump 3. When the filling is completed, the solenoid valve 19 is closed again.

If salts are concentrated in the sump 3, this is registered by means of a conductivity meter 43 signalling the opening of the solenoid valve 42 which closes again by means of a timer, which is not shown.

The apparatus is used in the following manner. The polluted liquid 41 to be treated is added by starting circulation pump 20, which is controlled by the level controller 27, so that the sump 3 is filled to a predetermined level.

Depending on the boiling point of the distillate 44, e.g., water, the liquid 41 is in this case heated in the sump by means of the heating element 25, e.g., to 100° C. When this temperature is reached the vapor compressor 36 is started by means of the thermostat 26 and the pressure switch 28, which have to register a pressure and a temperature corresponding to the boiling point temperature and the boiling point pressure of the distillate 44.

If this is not the case, e.g., because a liquid having a lower boiling point is mixed with the liquid 41, the pressure will be sufficiently high but the temperature will be too low. If this is the case, the vapor of the lower boiling liquid is led via the compressor 36 to the evaporation tank 1, from which it is led to the condensation chamber 23 through the solenoid valve 32 controlled by the pressure switch 33 and the thermostat 26 in combination.

When the pressure and the temperature in the sump 3 correspond to the distillate 44 which is to be separated, the vapor compressor 36 is started, and the vapor is led from the sump 3 to the evaporation tank 1.

When activating the apparatus the circulation pump 29 is started, so that the liquid 41 is transferred to the cover 16 from where, via the diversion ring 17, it is led down into the tubes 40 as a liquid film so that an optimal heat-transfer and thus an optimal evaporation is obtained.

After evaporation of the distillate 44, the concentrated oil and water drip down onto a hopper 7 ending in a wide tube 48. Owing to the differences in specific gravity, the oil will float and accumulate in the upper part of the wide tube 48.

The vapor that is carried along from the sump 3 passes through a perforated screen 8 in order to collect any drops. Furthermore, drops may be collected in the drop catch 38 placed in front of the compressor 36. The compressor 36 supplies energy to the vapor so that the temperature of the vapor is increased slightly, for water vapor typically from 100–102° C. This difference in temperature is to be maintained as low as possible in order to optimize the apparatus. The whole unit is arranged inside the insulated cabinet 35 in order to reduce heat loss to the surroundings.

The vapor driven by the compressor 36 is condensed on the outer side of the tubes 40 and is collected in the bottom of the evaporation tank 1, and can be drained off as a condensate 44 when a desired level is reached. The level controller 30 controls the solenoid valve 39 that drains off the distillated 44 through the heat exchanger 18, ensuring that the accumulated heat in the distillate 44 is given off to the liquid 41 to be treated.

Figure 4:
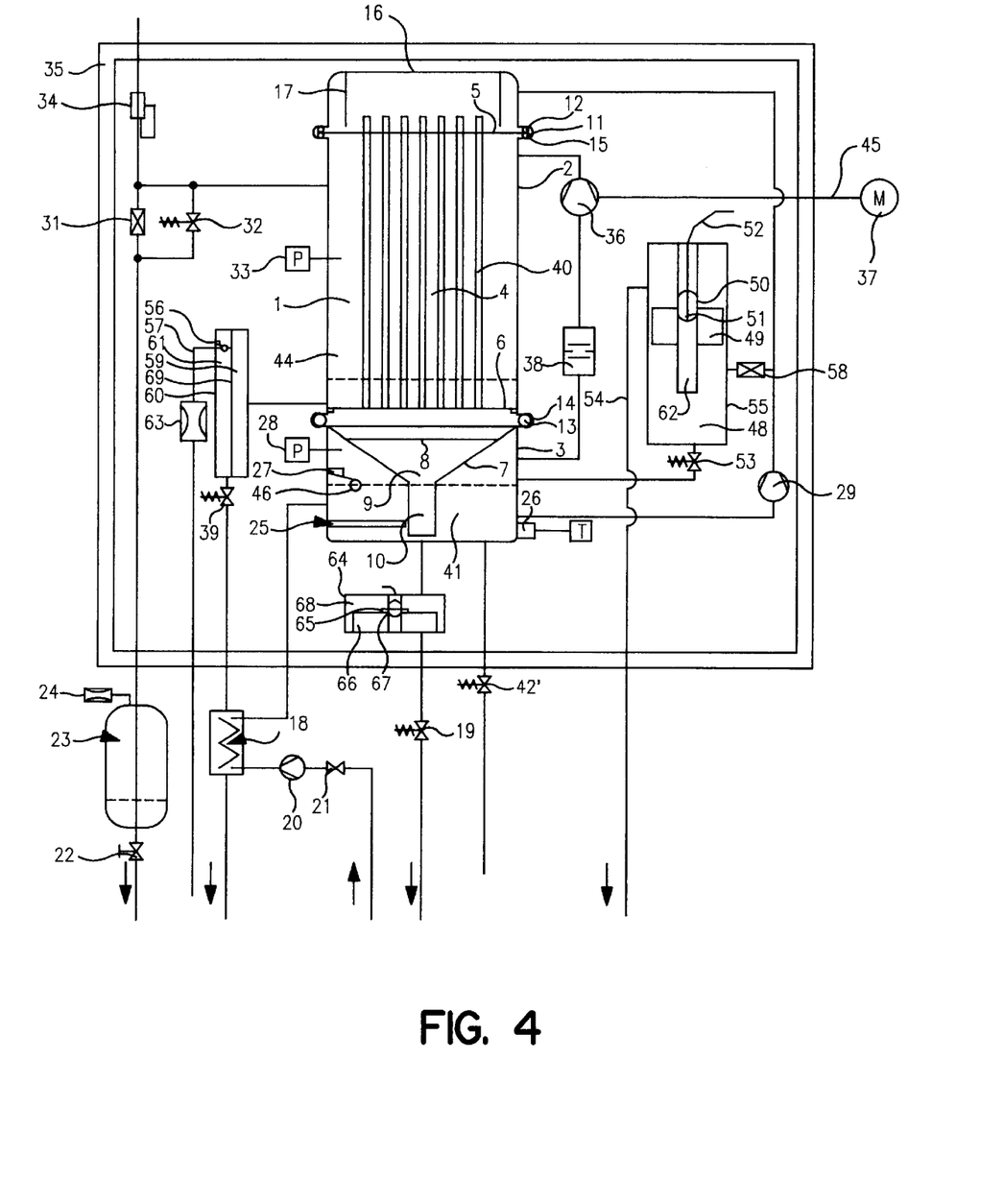
FIG. 4 is a schematic view of a further embodiment of the apparatus according to the invention with a gravitation separator and a density regulator.

The apparatus illustrated in FIG. 4 shows an embodiment where the vapor compression and the gravitation separation principles are combined in one unit.

A partial flow is extracted just after the circulation pump 29 and is fed through a restrictor 58 into a gravitation separator 48 consisting of a tube 55 with top and bottom. In this tube 55 a float 49 is placed, which float is supplied with a ring magnet 50 at the top. Both the float and the ring magnet surround a tube 62 in which a reed relay 51 is placed. When passing the reed relay 51, the ring magnet will activate this and control the open/close function of a solenoid valve 53 which is connected to the reed relay by a conduit 52. The float 49 is provided so that it floats in water but not in oil. Accordingly, the oil which has been separated as a result of gravitation rises to the surface and may subsequently be skimmed off through a connection pipe 54 as completely concentrated oil.

Using the gravitation separation method of the invention means that only a small amount or no oil is to be drained off through the solenoid valve 19 (not shown in FIG. 4).

When draining off the distillate 44, a mixture containing a small amount of residual oil may occur. Such mixture has been led through the vapor compressor 36 and is condensed together with the distillate 44.

To secure that this oil is separated, coalescing means 61 has been installed in front of the outlet via the solenoid valve 39 and the heat exchanger 18. The coalescing means 61 is provided in the form of a tube 60 with closed top and bottom. About half of the tube 60 has been filled up with an insulation material 59 of the type rockwool.

This insulation material is arranged behind a perforated plate 69. The material 59 is temperature resistant and will collect the small oil drops that may be condensed together with the distillate 44, so that these drops get larger and come to the surface, from which they are skimmed off through an outlet 57 and a restrictor 63. A level regulator 56 controls the solenoid valve 39 depending on the presence of oil or water around the level regulator 56.

In certain cases a concentration of ions can occur, resulting in an increased boiling temperature in the sump 3.

To control this a density regulator 68 is used consisting of a tube 64 with closed top and bottom, a float 66 with a permanent magnet 65 and a reed relay 67. The density regulator 68 is connected to the sump 3 and automatically controls the opening and closing of the solenoid valve 42' releasing a small amount of the liquid 41, and thus regulates the concentration thereof. The regulator 68 replaces the conductivity meter 43.

In this way it is possible to keep the ion concentration within a certain range and thereby the boiling point is also kept within a range securing continuous optimal operation of the unit.

Figure 5:
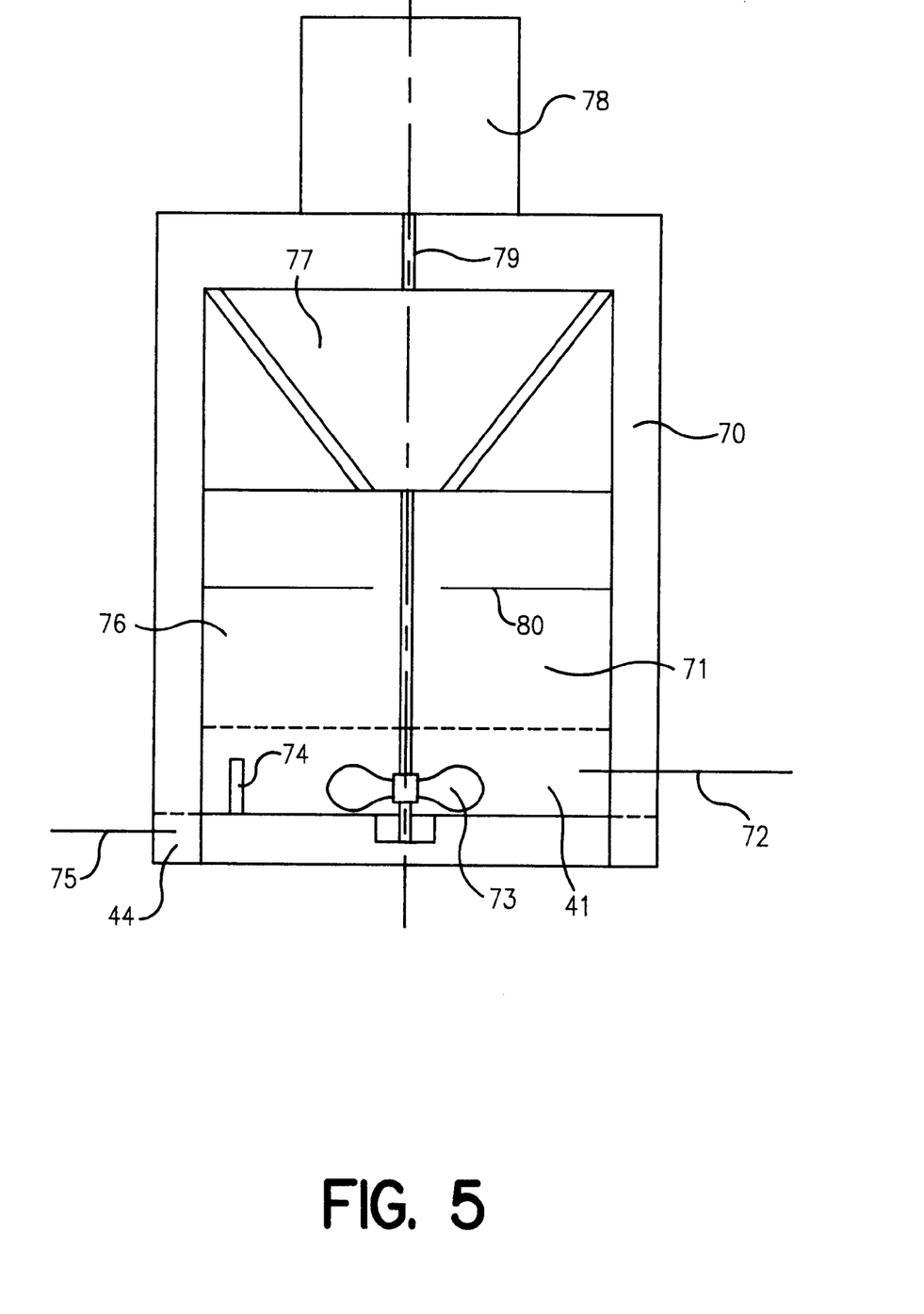
FIG. 5 is a schematic view of the apparatus according to the invention with an evaporator and a compressor as an integrated unit.

The apparatus illustrated in FIG. 5 shows a special embodiment in which the evaporator and compressor are produced in one unit. This version is particularly usable in small plants of capacities of 1–10 l/h.

The unit comprises an evaporation tank 71 containing an inner chamber 76 with a stirrer 73, a drop cover 80, a heating element 74, and an inlet 72 for filling of the polluted liquid 41. Between the inner chamber 76 and an outer chamber 70 a fan rotor 77 is placed. This is actuated by an electric motor 78, which also actuates the stirrer 73 on a common shaft 79.

The outer chamber 70 is also supplied with an outlet 75 for draining off the distillate 44.

The unit illustrated in FIG. 5 will be inexpensive, and it may be manufactured solidly. In addition, the unit may form a separate component of the apparatus illustrated in FIGS. 1, 2 and 4.

The principle is the same as for the apparatus illustrated in FIG. 1 with the difference that the inner and outer chambers 76 and 70 constitute the heat exchanger parts. The stirrer 73 will secure that vapors are giving free from the polluted liquid 41 and the pressure of the vapor is elevated by the fan rotor 77, so that it will condense in the outer chamber 70 in heat exchange with the inner chamber 76. The heating element 74 will elevate the temperature to the desired level, and in operation it will maintain the temperature dependent on signals from the thermostat 26 (not shown in FIG. 5).

Other controlling elements will be the same as illustrated for the apparatus according to FIGS. 1, 2 and 4.

It is essential to see the whole functional principle collectively, as evaporation, compression and condensation of the vapor take place simultaneously. The principle requires very little energy, as only the energy supplied by the compressor 36 and a number of minor losses are necessary for the process to work.

For oil containing waste water efficiencies of 40–80 are obtained, for solvents—for example R11—efficiencies of 15–30 are obtained, for refrigerants—for example R12, efficiencies of 15–30 are obtained. This means that substantial savings may be obtained when treating liquids, solvents, etc.

For solvents—for example R11—the typical operating conditions will be:

capacity: about 100 l/h
evaporation temperature: 24° C.
condensation temperature: 36° C.
evaporation pressure: 1027 mbar
condensation pressure: 1343 mbar For liquids with water as the main element, the typical operating conditions will be:

capacity: 100 l/h
evaporation temperature: 100° C.
condensation temperature: 101° C.
evaporation pressure: 1013 mbar
condensation pressure: 1052 mbar The apparatus according to the invention can be used for liquids having high boiling point as well as liquids having low boiling point, and will be able to separate the individual components of the liquid 41 to be treated. The high boiling liquids will remain in the sump 3 and be drained off, while the low boiling liquids are drawn off with the vapor and led to the tube heat exchanger 4. However, they will not condense at the high temperature existing here. Such vapors will be led to the condensing chamber 23 in which they are condensed and accordingly separated from the distillate.

We claim:

1. A method for purifying and separating water from an aqueous emulsion in a separation apparatus which includes a heat exchanger having first and second ends, a sump, a first circulation system for conveying water vapor from said sump to said heat exchanger, a compressor in said first circulation system for raising the temperature and pressure of water vapor therein, a second circulation system for conveying emulsion from said sump to said second end of said heat exchanger, a thermostat in communication with said sump, a first pressure switch in communication with said sump and including a bellows exposed to an atmosphere external to said sump, and a second pressure switch in communication with said heat exchanger and including a bellows exposed to said atmosphere external to said heat exchanger, said method comprising the steps of:

(a) feeding said aqueous emulsion to said sump of said separation apparatus, (b) heating said aqueous emulsion in said sump so as to generate water vapor and non-condensable gases from said emulsion, leaving concentrated emulsion, (c) conveying concentrated emulsion from said sump through said second circulation system to said second end of said heat exchanger so as to pass therethrough to said first end and back into said sump, (d) circulating said water vapor and non-condensable gases through said first circulation system from said sump to said heat exchanger, (e) compressing said water vapor and non-condensable gases in said first circulation system with said compressor and thereby raising the temperature thereof to an elevated temperature, (f) condensing said water vapor in said heat exchanger by non-contact heat exchange with said concentrated emulsion passing therethrough, said concentrated emulsion being heated to said elevated temperature to evaporate water therefrom, (g) maintaining a temperature difference between evaporation and condensation within 0.5 to 3° C. by operation of said thermostat and said first and second pressure switches, said thermostat being filled with water vapor and water identical with distillate at its boiling point, and (h) automatically adjusting pressures within said heat exchanger and said sump by said first and second pressure switches based on atmospheric pressure external to said heat exchanger and said sump which acts on said respective bellows thereof.

2. A method according to claim 1, including a step of diverting a portion of said concentrated emulsion conveyed from said sump to said second end of said heat exchanger in step (c) to a gravity separator where water is separated from said emulsion.

3. A method according to claim 1, wherein the compressor maintains a pressure difference between the water vapor in said sump and the water vapor at said second end of said heat exchanger within a range of about 20 to 120 mbar.

4. A method according to claim 1, including the step of venting said non-condensable gases from said heat exchanger.

5. A method for purifying and separating solvent from an solvent emulsion in a separation apparatus which includes a heat exchanger having first and second ends, a sump, a first circulation system for conveying solvent vapor from said sump to said heat exchanger, a compressor in said first circulation system for raising the temperature and pressure of solvent vapor therein, a second circulation system for conveying emulsion from said sump to said second end of said heat exchanger, a thermostat in communication with said sump, a first pressure switch in communication with said sump and including a bellows exposed to an atmosphere external to said sump, and a second pressure switch in communication with said heat exchanger and including a bellows exposed to said atmosphere external to said heat exchanger, said method comprising the steps of:

(a) feeding said solvent emulsion to said sump of said separation apparatus, (b) heating said solvent emulsion in said sump so as to generate solvent vapor and non-condensable gases from said emulsion, leaving concentrated emulsion, (c) conveying concentrated emulsion from said sump through said second circulation system to said second end of said heat exchanger so as to pass therethrough to said first end and back to said sump, (d) circulating said solvent vapor and non-condensable gases through said first circulation system from said sump to said heat exchanger, (e) compressing said solvent vapor and non-condensable gases in said first circulation system with said compressor and thereby raising the temperature thereof to an elevated temperature, (f) condensing said solvent vapor in said heat exchanger by non-contact heat exchange with said concentrated emulsion passing therethrough, said concentrated emulsion being heated to said elevated temperature to evaporate solvent therefrom, (g) maintaining a temperature difference between evaporation and condensation within 1 to 6° C. by operation of said thermostat and said first and second pressure switches, said thermostat being filled with solvent vapor and solvent identical with distillate at its boiling point, and (h) automatically adjusting pressures within said heat exchanger and said sump by said first and second pressure switches based on atmospheric pressure external to said heat exchanger and said sump which acts on said respective bellows thereof.

6. A method according to claim 5, wherein the compressor maintains a pressure difference between the solvent vapor in said sump and the solvent vapor at said second side of said heat exchanger within a range of about 50 to 200 mbar.

* * * * *